United States Patent
Xu

(10) Patent No.: US 8,780,521 B2
(45) Date of Patent: Jul. 15, 2014

(54) METAL OXIDE VARISTOR WITH BUILT-IN ALLOY-TYPE THERMAL FUSE

(76) Inventor: Zhonghou Xu, Fujian (CN)

( * ) Notice: Subject to any disclaimer, the term of this patent is extended or adjusted under 35 U.S.C. 154(b) by 713 days.

(21) Appl. No.: 11/792,991

(22) PCT Filed: Nov. 1, 2005

(86) PCT No.: PCT/CN2005/001810
§ 371 (c)(1),
(2), (4) Date: Jun. 13, 2007

(87) PCT Pub. No.: WO2006/063503
PCT Pub. Date: Jun. 22, 2006

(65) Prior Publication Data
US 2008/0088405 A1    Apr. 17, 2008

(30) Foreign Application Priority Data

Dec. 13, 2004  (CN) ...................... 2004 2 0120952 U
Sep. 3, 2005   (CN) .......................... 2005 1 0044661

(51) Int. Cl.
*H02H 1/00*    (2006.01)
(52) U.S. Cl.
USPC ............................ 361/127; 361/124; 361/126
(58) Field of Classification Search
USPC .......................... 361/127, 124, 126
See application file for complete search history.

(56) References Cited

U.S. PATENT DOCUMENTS

| | | | |
|---|---|---|---|
| 4,023,071 A * | 5/1977 | Fussell | 361/56 |
| 5,720,859 A * | 2/1998 | Czubarow et al. | 204/157.43 |
| 6,252,754 B1 * | 6/2001 | Chaudhry | 361/111 |
| 6,819,215 B2 * | 11/2004 | Tanaka | 337/290 |
| 6,838,971 B2 | 1/2005 | Senda et al. | |
| 2002/0054465 A1 * | 5/2002 | Gerlach | 361/111 |
| 2003/0043519 A1 * | 3/2003 | Wu et al. | 361/91.1 |
| 2008/0129440 A1 * | 6/2008 | Ho | 337/5 |

FOREIGN PATENT DOCUMENTS

| | | |
|---|---|---|
| CN | 2615943 Y | 5/2004 |
| JP | 2001-297904 | 10/2001 |

* cited by examiner

*Primary Examiner* — Jared Fureman
*Assistant Examiner* — Lucy Thomas
(74) *Attorney, Agent, or Firm* — Gokalp Bayramoglu

(57) ABSTRACT

An electronic protection component incorporates both a varistor and an alloy-type thermal fuse. In one embodiment, a melting promoting agent or flux contacts and surrounds both the varistor and the fuse in common in a shared cavity of a case. In another embodiment, the fuse and the flux are disposed in an inner case, which is disposed in contact with the varistor in an outer case. Thus, the varistor and the thermal fuse are incorporated so that the speed of heat transfer is fast, the response time is fast, and the installation for use is convenient.

6 Claims, 5 Drawing Sheets

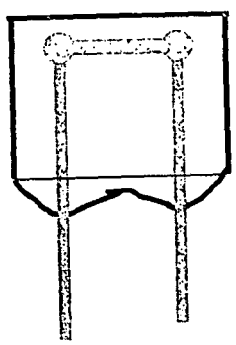
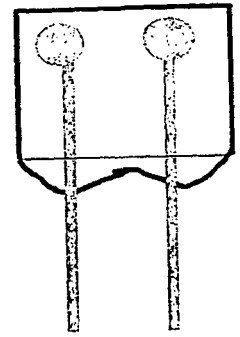
fig. 1A    fig. 1B
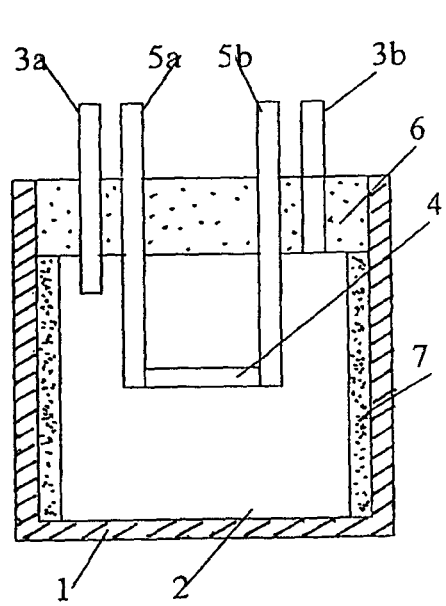
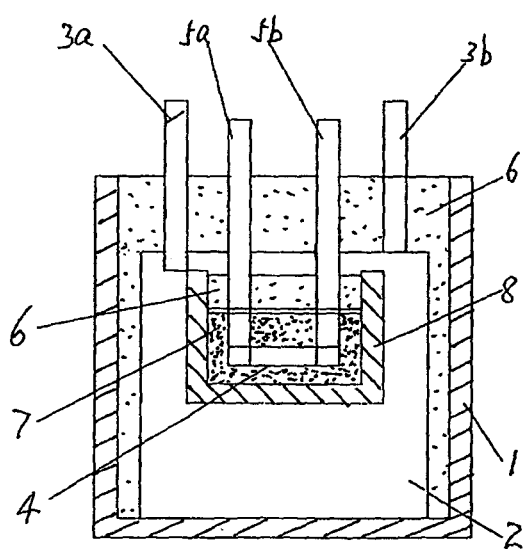
fig. 2A    fig. 2B

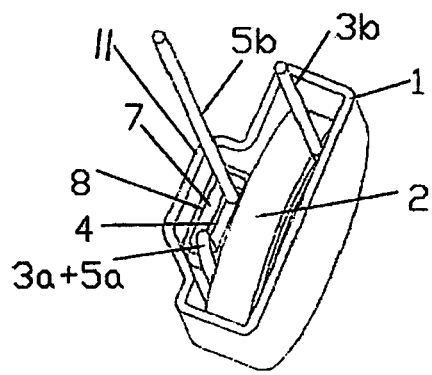
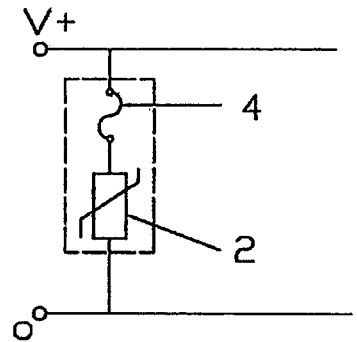
fig. 3A                fig. 3B
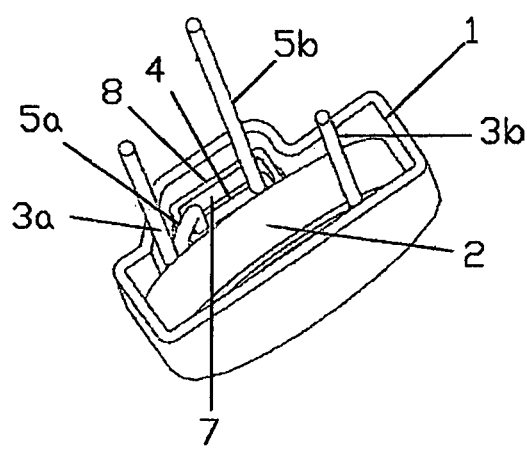
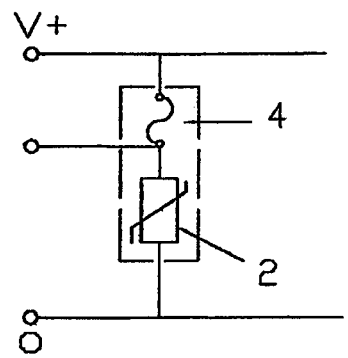
fig. 4A                fig. 4B

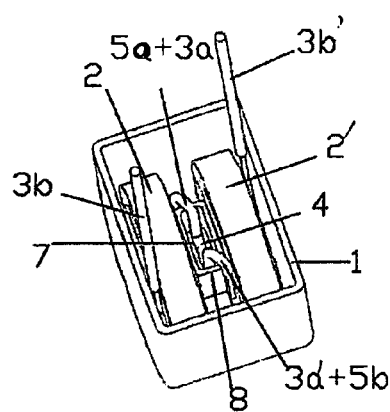
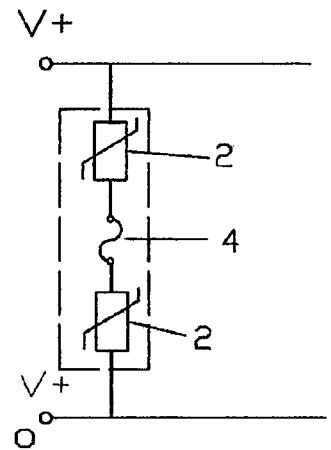
fig. 6A
fig. 6B
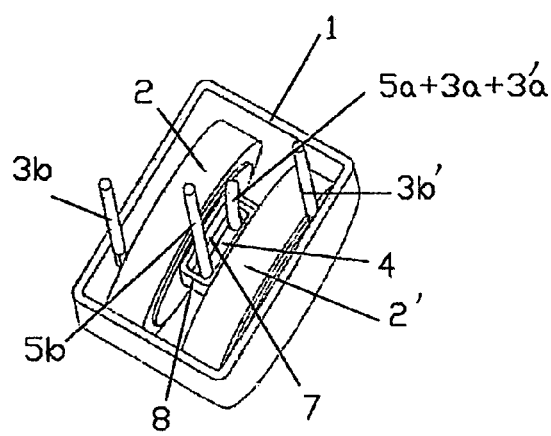
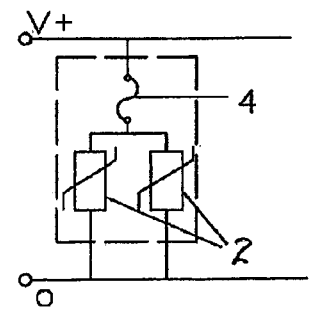
fig. 7A
fig. 7B

METAL OXIDE VARISTOR WITH BUILT-IN ALLOY-TYPE THERMAL FUSE

The invention relates to a varistor with built-in alloy-type thermal fuse with thermal failure protection which is particularly applied to zinc oxide varistors and used for over-voltage protection.

BACKGROUND OF THE INVENTION

A varistor is broadly used as an over-voltage protection component and surge absorption component of circuit, equipment and components because of its non-linear volt-ampere character. Irrespective whether the varistor is used in power circuitry or electrical circuitry, if transient over-voltage happens frequently, the varistor will operate to suppress over-voltage frequently. At the same time, it will adsorb and release surge energy to protect electrical equipment and components, which will certainly cause the varistor to fail or be damaged. When the varistor suffers transient over-voltage, it will be rapidly partially destroyed and causing fire. Nowadays, most varistors with thermal failure protection have some disadvantages such as the following: Some have a complex structure and slow response rate such as a thermally protected metal oxide varistor which is a traditional module with thermal cutoff device of spring mode such as disclosed in Chinese patent number CNO2222055.0, published on Feb. 12, 2003. Another type is a thermally protected device with a slow response rate or a weak capacity to withstand the capacity of a high surge current such as a traditional safe varistor connected exteriorly with a pellet-type or alloy-type thermal fuse such as disclosed in Chinese patent number CN00237913.9, published on Oct. 31, 2001.

SUMMARY OF THE INVENTION

The objective of the invention is to provide a varistor with a built-in alloy-type thermal fuse which has a simple compact structure, rapid response and wide application.

The principle of the invention is to incorporate or integrate the varistor and the thermal fuse to form a varistor with self-invalidation protection utilizing the advantage of an alloy-type thermal fuse.

The invention can be implemented as following: it comprises a varistor, an alloy-type thermal fuse and a closed cavity. The varistor and alloy-type thermal fuse is placed in the closed cavity with a surface of the varistor being close to a surface of the alloy-type thermal fuse. Their leads are extended to the outside of the closed cavity which is filled with the alloy melting promoting agent.

One embodiment includes a case with an opening. The varistor and alloy-type thermal fuse are placed in parallel in the case which is filled with alloy melting promoting agent. The upward opening of the case is filled in with a seal material of epoxy resin to form a closed cavity.

In an embodiment, the varistor and alloy-type thermal fuse are placed in the closed cavity in parallel with one surface of each clinging to each other. The leads are extended to the outside of the cavity which is filled with the melting promoting agent such as a resin.

The closed cavity may comprise a case with an opening. The front wall of the case extends to the outside to form a raised part for accommodating a small case. The opening of the shell is sealed by seal materials of epoxy resin to form the closed cavity.

The alloy-type thermal fuse may be a low melting point alloy wire with leads in its two ends.

The small case may be made of ceramic or a material of high heat conductivity and high electrical insulation. At least one side wall should be smooth. The thermal fuse may be located in the small case which is made of ceramic or other material of high heat conductivity and high electrical insulation. This arrangement can save the material of melting promoting agent and prevent dispersal. It can also extinguish arc and at the same time improve electrical insulation.

Products with different structures can be made according to the requirements of the circuit on the basis of the above basic structure.

Thermally Protected Varistors with Two Leads

One lead of the alloy-type thermal fuse is connected with the closer lead of the varistor and the connecting point is sealed in the cavity. Another lead of the alloy-type thermal fuse and another lead of the varistor extend to the outside of the closed cavity.

Thermally Protected Varistors with Three Leads

Both leads of the varistor extend to the outside of the cavity. One lead of the varistor which is close to the thermal fuse is connected with one lead of the alloy-type thermal fuse and the connecting point is sealed in the cavity. Another lead of the alloy-type thermal fuse extends to the outside of the cavity.

Thermally Protected Varistors with Four Leads

The leads of the alloy-type thermal fuse and the leads of the varistor extend to the outside of the cavity. The leads are not connected with each other.

Thermally Protected Varistors Connected in Series

Two varistors are mounted in the cavity. Two leads of the alloy-type thermal fuse which is sandwiched between two varistors are respectively connected with one lead of two corresponding varistors. The connecting points are sealed in the cavity. Two varistors are connected in series through the thermal fuse. Their other leads respectively extend to the outside of the closed cavity.

Thermally Protected Varistors in Parallel Connection

Two varistors are mounted in the cavity. After the opposite leads are connected with each other, then connected with one lead of the alloy-type thermal fuse, the connecting point is sealed in the cavity. Two varistors are connected parallel with each other. The alloy-type thermal fuse is sandwiched between two varistors. Another two leads of two varistors and another lead (or two leads) of the alloy-type thermal fuse respectively extend to the outside of the closed cavity.

Thermally Protected Varistor with Alarm Function

Alarm contacts with temperature control can be placed at one side of the alloy-type thermal fuse and the varistor in the closed cavity. There are two modes: from normal closed contacts turning to normal open contacts or from normal open contacts turning to normal closed contacts.

Thermally Protected Varistor with the Function of Startup and Backup Varistor

Transferable contacts with temperature control which are from normal open turning to normal closed can be placed at the side of the varistor. The backup varistor and transferable contacts are linked in the circuit after connecting in series. When transferable contacts turn to normal closed from normal open, the backup varistor can be connected with the circuit and start its function immediately. It is also possible to make a backup varistor with a function which can start the next backup varistor.

In the invention, the varistor and the thermal fuse are integrated so that the speed of heat transfer is faster and the installation is convenient when in use. Under the action of the melting promoting agent, the melted alloy of the thermal fuse shrinks rapidly toward the two leads and agglomerates to form two balls of the melted alloy on the two leads. The melting promoting agent is also called a "flux", and according to the present invention it may especially be a resin. Alloys of different melting points and sizes may be chosen for the thermal fuse to match the varistors of different peak current according to different requirements.

The invention has many advantages. First of all, the invention can satisfy the requirements of varistors with different peak current and varistor voltage to absorb the over-voltage of lightning strike and surge voltage. Secondly when the varistor operates to suppress over-voltage frequently, absorbing and releasing surge energy will cause the varistor to be deteriorated or disabled. The various structures can have the function of failure protection when the leakage current of the varistor is lower than 10 milli-ampere (it also can start the function of failure protection when the leakage current of the varistor is lower but it will reduce the peak current properly). Thirdly, when the varistor withstands transient over-voltage and leakage current of the varistor is lower than 300 milli-ampere, the various structures of the invention can start the function of invalid protection before the varistor is destroyed. If the leakage current of the varistor is over 10 ampere, the various structures of the invention can start the function of invalidation failure protection rapidly after the varistor is destroyed. Fourthly, the various structures of the invention can promote absorption and release of the surge energy.

BRIEF EXPLANATION OF THE DRAWINGS

FIG. 1A: The drawing before thermal fuse cutting off;
FIG. 1B: The drawing after the thermal fuse has cut off, showing the melted alloy shrunk to two balls under the influence of the melting promoting agent;
FIG. 2A: The drawing of the basic structure of a first embodiment;
FIG. 2B: The drawing of the basic structure of a second embodiment;
FIG. 3A: The structure drawing of an application for two leads;
FIG. 6A: The structure drawing of an application for two varistors in series;
FIG. 6B: The circuit drawing of an application for two varistors in series;
FIG. 3B: The circuit drawing of an application for two leads;
FIG. 4A: The structure drawing of an application for three leads;
FIG. 4B: The circuit drawing of an application for three leads;
FIG. 6A: The structure drawing of an application for a varistor in series;
FIG. 6B: The circuit drawing of an application for a varistor in series;
FIG. 7A: The structure drawing of an application for a varistor in parallel;
FIG. 7B: The circuit drawing of an application for two varistors in parallel.

DETAILED DESCRIPTION OF EXAMPLE EMBODIMENTS OF THE INVENTION

Figure 5:
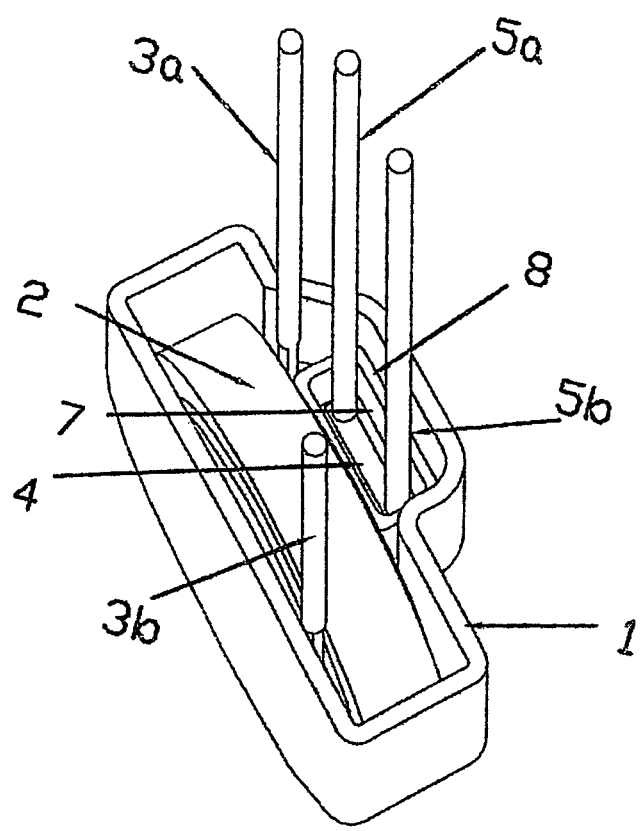
FIG. 5: The structure drawing of an application for four leads.

Reference Numerals: 1. case or outer case; 2. varistor; 3. leads of varistor; 4. alloy-type thermal fuse; 5. leads of thermal fuse; 6. seal material of epoxy resin; 7. alloy melting promoting agent; 8. small inner case; 9. alarm contacts with temperature controlled and normal open turning to normal closed or normal closed turning to normal open; 10. transferable device with normal open turning to normal close.

EMBODIMENTS

Embodiment 1

Shown in FIG. 2A is the drawing of the basic structure of the first embodiment which comprises a case 1, a varistor 2 and an alloy-type thermal or temperature fuse 4. The varistor 2 and alloy-type thermal fuse 4 are placed in the case 1 with the surface of the varistor 2 being close to the surface of the alloy-type thermal fuse 4. The case 1 is filled with alloy melting promoting agent 7. The opening of the shell or case 1 is sealed by epoxy resin 6 to form the closed chamber. The leads 3 of the varistor and leads 5 of the fuse are extended to the outside of the case 1.

In use, when the varistor 2 is heated by various causes, the heat is transferred first to the ambient or surrounding alloy melting promoting agent 7 from the surface of the varistor 2 and then is transferred from the melting promoting agent 7 to the alloy-type thermal fuse 4 until the alloy is melted due to the heating and balls-up and shrinks towards the two leads 5a and 5b of the fuse 4 rapidly under the influence of the alloy melting promoting agent 7 (as shown in the transition from FIG. 1A to FIG. 1B), so as to switch off the circuit. Namely, the fuse 4 is cut-off or opened, so that thereby the varistor 2 will be separated from the circuit.

Embodiment 2

Shown in FIG. 2B, is the basic structure of the second embodiment which comprises a varistor 2, an alloy-type thermal fuse 4, an outer case 1 and a small inner case 8. The alloy-type thermal fuse 4 and melting promoting agent, e.g. resin 7 are placed in the small inner case 8 which is made of ceramic or other material of high heat conduction and high electrical insulation, the opening of the small inner case 8 being sealed by epoxy resin 6 with the inner side of the small inner case 8 clinging to one surface of the varistor 2. The small inner case 8 and the varistor 2 are placed in the outer case 1 with the opening of the case 1 being sealed by epoxy resin 6 to form the closed cavity.

When varistor 2 is heated by various causes, heat is transferred from the surface of the varistor 2 to the contacting wall of the inner case 8, and thence into the alloy melting promoting agent 7 that fills the inner case, and then the heat is transferred to the alloy-type thermal fuse 4 until the alloy is melted after heating and thereby the melted alloy shrinks rapidly toward the two leads 5a and 5b of the thermal fuse 4 under the influence of the alloy melting promoting agent 7, so that the circuit is cut off. The damaged or defective overheating varistor 2 will thereby be separated from the circuit.

Embodiment 3

Shown in FIGS. 3A and 3B, is an embodiment for two leads which comprises a varistor 2, an alloy-type thermal fuse 4, an outer case 1 and an inner small case 8. The front wall of the outer case 1 extends to the outside to form a raised part 11 for accommodating the small case 8 therein. The alloy-type thermal fuse 4 and melting promoting agent such as a resin 7 are placed in the small case 8 which is made of ceramic or other material of high heat conduction and high electrical insulation. The opening of the small case 8 is sealed by epoxy resin 6 with the inner side of the small case 8 clinging to one surface of the varistor 2. The small case 8 and the varistor 2 are placed in the case 1 (as shown in FIG. 2B). The first lead 3a of the varistor 2 is connected with the second lead 5a of the alloy-type thermal fuse 4 and closed in the case. The second lead 3b of the varistor 2 and the first lead 5b of the alloy-type thermal fuse 4 respectively extend to the outside of the case. The opening of the shell 1 is sealed by epoxy resin 6 to form the closed cavity.

Embodiment 4

Shown in FIG. 5, it is the drawing of an application for four leads. The difference from embodiment 3 is that the leads 3a and 3b of the varistor 2 and the leads 5a and 5b of the alloy-type thermal fuse 4 all extend to the outside of case 1. The leads are not connected to each other. The opening of the case 1 is sealed by epoxy resin 6.

Embodiment 5

Shown in FIGS. 6A and 6B, the embodiment for two varistors in series comprises two varistors 2 and 2', an alloy-type thermal fuse 4, an outer case 1 and an inner small case 8. The case 1 is rectangular. Alloy-type thermal fuse 4 and melting promoting agent such as resin 7 are installed into small case 8 whose opening is sealed by epoxy resin 6. The small case 8 is sandwiched between varistors 2 and 2'. One external side of the small case 8 clings to one surface of the first varistor 2. Another external side of the small case 8 clings to one surface of the second varistor 2'. They are placed into the case 1. One lead 5a of the alloy-type thermal fuse 4 is connected with one lead 3a of the first varistor 2. Another lead 5b of the alloy-type thermal fuse 4 is connected with one lead 3a' of the second varistor 2'. They are closed in the case 1. The first varistor 2 and the second varistor 2' are connected in series. Another lead 3b of the first varistor 2 and another lead 3b' of the second varistor 2' respectively extend to the outside of the case 1. The opening of the case 1 is sealed by epoxy resin 6. This series-connected application can realize the addition of two varistor voltages. When a single varistor has difficulty meeting the demand of a higher varistor voltage, it will be endured by two series-connected varistors with lower varistor voltage and at the same time it has protection function of invalidation.

Embodiment 6

Shown in FIGS. 6A and 6B, the embodiment for two varistors in series comprises two varistors 2 and 2', an alloy-type thermal fuse 4, a case 1 and a small case 8. The case 1 is rectangular. Alloy-type thermal fuse 4 and melting promoting resin 7 are installed into small case 8 whose opening is sealed by epoxy resin 6. The small case 8 is sandwiched between varistors 2 and varistor 2'. One external side of the small case 8 clings to one surface of the first varistor 2. Another external side of the small case 8 clings to one surface of the second varistor 2'. They are placed into the case 1. One lead 5a of the alloy-type thermal fuse 4 is connected with one lead 3a of the first varistor 2. Another lead 5b of the alloy-type thermal fuse 4 is connected with one lead 3a' of the second varistor 2'. They are closed in the case 1. The first varistor 2 and the second varistor 2' are connected in series. Another lead 3b of the first varistor 2 and another lead 3b' of the second varistor 2' respectively extend to the outside of the case 1. The opening of the case 1 is sealed by epoxy resin 6. This application can realize the addition of two varistor voltage. When a single varistor has difficulty meeting the demand of a higher varistor voltage, it will be endured by two varistors with lower varistor voltage and at the same time it has protection function of invalidation.

Embodiment 7

Shown in FIGS. 7A and 7B is the drawing of an embodiment for two varistors connected in parallel comprising two varistors 2 and 2', an alloy-type temperature fuse 4, a case 1 and a small case 8. The difference from embodiment 6 is that one lead 3a of the first varistor 2 connects with one lead 3a' of the second varistor 2' then connects with one lead 5a of the alloy-type thermal fuse 4 which is sandwiched between the two varistors 2, 2', connected in series. Another lead 3b of the first varistor 2 and another lead 3b' of the second varistor 2' and another lead 5b of the alloy-type thermal fuse 4 respectively extend to the outside of the case 1. The opening of the case 1 is sealed by epoxy resin 6. This embodiment can increase peak current when varistor voltage is stable and at the same time it has protection function of invalidation.

According to the principle of embodiments 5 and 6, it is possible to make more than two varistors connected in series or parallel and so on.

Embodiment 8

Figure 8A:
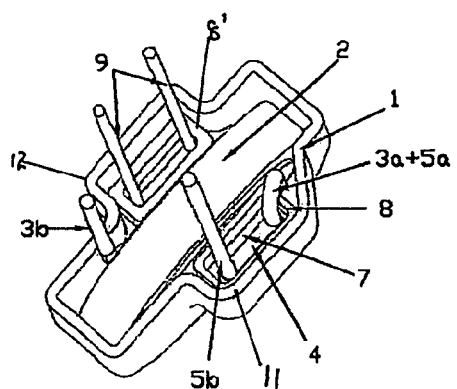
FIG. 8A: The structure drawing of an application with alarm function.
Figure 8B:
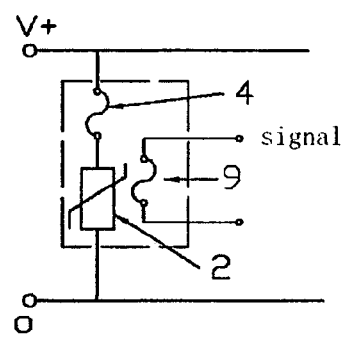
FIG. 8B: The circuit drawing of an application with alarm function.
Figure 9:
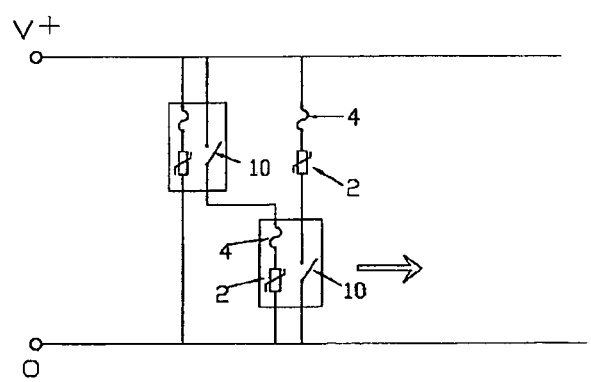
FIG. 9: The circuit drawing of an application with startup and backup varistor.

FIG. 8 is the embodiment with alarm function, based on the structure of embodiment 2 to embodiment 7. It is possible to place alarm contacts with temperature control 9 at one side of the alloy-type thermal fuse in the cavity. There are two modes: from normal closed contacts turning to normal open contacts or from normal open contacts turning to normal closed contacts. The alarm contacts 9 can control the connected indication light to be on or off to realize the alarm function.

As shown in FIG. 8, the drawing of the single varistor with alarm function comprises a varistor 2, an alloy-type temperature fuse 4, a case 1 and small cases 8 and 8'. The front wall and the rear wall of the case 1 extends to the outside to form raised parts 11 and 12 for accommodating the small cases 8 and 8'. The alloy-type thermal fuse 4 and alloy melting promoting agent 7 are installed into the small case 8 whose opening is sealed by epoxy resin 6. The alarm contacts with temperature control are installed into the other small case 8'. The inner side of the small case 8 clings to the surface of the varistor 2. The inner side of the other small case 8' clings to another surface of the varistor 2. The two small cases 8 and 8' and the varistor 2 are all placed into the case 1 whose opening is sealed by epoxy resin 6.

Embodiment 9

In embodiments 3 to 8, when varistor 2 is heated by various causes, heat is transferred from the varistor by contact conduction to a small case which is made of ceramic or another material of good thermal conductivity and electrical insulation. Thereby the heat is transferred to the alloy-type thermal fuse 4 through the surrounding alloy melting promoting agent 7 which fills the small case. Heat can also be transferred to the thermal fuse 4 through its leads 5. The fuse's alloy is melted after heating and shrinks rapidly toward the two leads of the thermal fuse 4 under the influence of the alloy melting promoting agent 7 (as shown in FIGS. 1A to 1B) so as to cut off the circuit. The varistor 2 will be separated from the circuit. This design has a quick response to heat and it has an easy to assemble and compact structure.

With regard to embodiments 1 to 7, it is possible to solder the leads 3a and 3b on a silver layer of a bare disc of the sintered varistor on two sides. The finished product which is sealed by epoxy resin powder is placed in the closed cavity and mates or fits with the alloy-type thermal fuse 4. Another method is to solder one round sheet of copper on one-side of a silver layer of the bare disc of a sintered varistor and then solder lead 3b on the round sheet of copper. Another silver layer can be provided as lead 3a and is placed into the cavity after connecting it with the alloy-type thermal fuse 5a. The opening of the inside cavity and other spacing parts are filled and sealed by epoxy resin.

The invention of a varistor with an alloy-type thermal fuse having a simple structure, connecting easily with other parts, can be volume-produced and have a favorable industry practicability.

The invention claimed is:

1. An electronic protection component comprising:
   an outer case bounding an outer cavity therein;
   a varistor with two varistor leads connected thereto, wherein said varistor is arranged in said outer cavity;
   a raised section created by extending the front wall of the outer case;
   an inner case bounding an inner cavity therein, wherein said inner case has a flat side wall, and said inner case is arranged in said raised section of said outer cavity with said flat side wall in flat planar surficial contact with a surface of said varistor;
   an alloy-type thermal fuse made of an alloy fuse material with two fuse leads connected thereto, wherein said fuse is arranged in said inner cavity of said inner case;
   an alloy melting promoting agent filled into said inner cavity such that said alloy melting promoting agent surrounds and contacts said alloy fuse material of said fuse in said inner cavity;
   an epoxy resin seal that seals an opening of said outer case so as to enclose and seal said outer cavity with said varistor and said inner case therein, and with at least two of said leads extending out of said outer case through said epoxy resin seal;
   wherein one of said varistor leads is connected directly to one of said fuse leads at a lead junction within said outer case, said lead junction is enclosed and sealed under said epoxy resin seal within said outer case for shortening the distance of heat conduction;
   wherein said electronic protection component is capable of transferring heat from said varistor to said alloy-type thermal fuse by combination of contact between said varistor and said inner case and through said lead junction and through one of said fuse leads that is connected to said lead junction.

2. The electronic protection component according to claim 1, wherein said alloy melting promoting agent is a flux that has an effect of causing said alloy fuse material, and the flux can increase the surface tension of the liquid alloy when said alloy fuse material melts, to shrink together and agglomerate to form two balls of said alloy fuse material respectively on said two fuse leads.

3. The electronic protection component according to claim 1, wherein said alloy melting promoting agent is a resin.

4. The electronic protection component according to claim 1, wherein, the second lead of said varistor leads extends out of said outer case forming a first lead, the second terminal of said fuse leads extends out of said outer case forming a second lead, said junction is connected to a third lead outside said outer case.

5. The electronic protection component according to claim 1, further comprising a second raised section created by extending the second longitudinal wall of the outer case; a second inner case bounding a second inner cavity therein and said second inner case is located in said second raised section within said outer case, and a thermal switching element for an alarm indicator circuit arranged in said second inner cavity, wherein said second inner case has a second flat longitudinal side wall and is arranged in said outer cavity with said second flat longitudinal side wall in flat planar surficial contact with a second surface of said varistor opposite said inner case with said fuse therein.

6. The electronic protection component according to claim 5, wherein a first terminal of said alloy type thermal fuse is connected to a first outside lead, a second terminal of said alloy type thermal fuse is connected to a first terminal of said varistor, a second terminal of said varistor is connected to a second outside lead, said thermal switching having a first terminal and a second terminal, said first terminal of said thermal switching element is connected to a third outside lead, said second terminal of said thermal switching element is connected to a fourth outside lead.

* * * * *